United States Patent [19]

Damezin et al.

[11] Patent Number: 5,333,158
[45] Date of Patent: Jul. 26, 1994

[54] DEVICE AND METHOD FOR THE MEASUREMENT OF THE NEUTRON FLUX IN THE CORE OF A NUCLEAR REACTOR

[75] Inventors: Jean Damezin, Paris; Guy Desfontaines, Puteaux; Jean-Paul Millot, Elancourt, all of France

[73] Assignee: Framatome, Courbevoie, France

[21] Appl. No.: 859,976

[22] Filed: Mar. 30, 1992

[30] Foreign Application Priority Data

Mar. 29, 1991 [FR] France ................... 91 03914

[51] Int. Cl.[5] ............................. G21C 17/00
[52] U.S. Cl. ................... 376/254; 376/246; 376/247
[58] Field of Search ............ 376/254, 246, 247, 255, 376/256; 976/DIG. 238

[56] References Cited

U.S. PATENT DOCUMENTS

| | | | |
|---|---|---|---|
| 3,165,446 | 1/1965 | Untermyer, II | 376/254 |
| 3,769,156 | 10/1973 | Brecy | 376/255 |
| 3,932,211 | 1/1976 | Loving, Jr. | 376/255 |
| 3,998,693 | 12/1976 | Musick | 376/207 |
| 4,186,048 | 1/1980 | Thomas | 376/254 |
| 4,708,844 | 11/1987 | Kearton et al. | 376/247 |
| 5,057,270 | 10/1991 | Chevereau | 376/254 |
| 5,179,515 | 1/1993 | Lunz et al. | 364/167.01 |

FOREIGN PATENT DOCUMENTS

| | | |
|---|---|---|
| 0360629 | 3/1990 | European Pat. Off. . |
| 2573236 | 5/1986 | France . |

Primary Examiner—Donald P. Walsh
Assistant Examiner—Meena Chelliah
Attorney, Agent, or Firm—Pollock, Vande Sande & Priddy

[57] ABSTRACT

The device comprises a mobile probe which can be displaced inside thimbles. A plurality of ducts (20) for the passage and support of a thimble are disposed in the partitioning (6) of the reactor, around the core (4) along an axial direction and substantially over the entire height of the core. The ducts (20) are distributed circumferentially around the core (4). A plurality of feed-through sleeves in the cover of the vessel are each disposed along the axial extension of a duct (20) for the passage of a thimble. Guide columns each disposed along the axial extension of a duct and each engaged in a feed-through sleeve in the cover of the vessel form, with the corresponding duct (20) and feed-through sleeve, a channel for the reception of a thimble. An arrangement for the guidance, displacement, switching and parking of the mobile probe is disposed outside the vessel (1) and fixed on to the cover of the vessel. This arrangement comprises a plurality of guide tubes each connected at one of its ends to the apparatus for displacement, guidance and switching of the mobile probe and, at its other end, to a thimble. The device with mobile probe enables a readjustment to be carried out to the measurements of neutron flux made by a set of fixed instruments comprising in particular external multistage fission chambers (40).

11 Claims, 6 Drawing Sheets

DEVICE AND METHOD FOR THE MEASUREMENT OF THE NEUTRON FLUX IN THE CORE OF A NUCLEAR REACTOR

FIELD OF THE INVENTION

The invention relates to a device and a method for the measurement of the neutron flux in the core of a nuclear reactor.

BACKGROUND OF THE INVENTION

Nuclear reactors, and particularly pressurized water-cooled nuclear reactors, comprise a vessel of generally cylindrical shape having a vertical axis and enclosing the reactor core, which consists of fuel assemblies with a prismatic shape juxtaposed and disposed vertically. A primary circuit ensures the circulation and cooling of the pressurized water forming the primary coolant of the nuclear reactor. The primary circuit comprises at least one loop, and generally three or four loops, which are in communication with the internal volume of the vessel at their ends. The fuel assemblies of the core are disposed and maintained in partitioning surrounding the core inside the vessel. The vessel is closed at its upper part by a detachable cover which permits access to the inside of the vessel, for example to carry out the reloading of the core with fuel assemblies.

Nuclear reactors, and particularly pressurized water-cooled nuclear reactors, comprise means for measurement making it possible to obtain the value of the neutron flux in the core of the nuclear reactor and the spatial distribution of this neutron flux while the reactor is running.

These means for measurement comprise detectors of various types which can be introduced into the core of the nuclear reactor and which constitute the internal instrumentation of the core.

The detectors may consist, for example, of fission probes, gamma thermometers, aeroballs or hydroballs. These detectors are introduced into a certain number of fuel assemblies in such a way as to allow a determination of the spatial distribution of the flux in the interior of the whole core.

The detectors may be permanently present in the core and, in this case, the instrumentation is said to be fixed or, on the contrary, these detectors may be introduced into the core when they are being used for measurements, and the instrumentation is then said to be mobile.

In the first case, the flux measurements are used directly for carrying out surveillance of the core.

In the second case, the surveillance of the core is carried out using the data provided by other sensors, for example multi-stage fission chambers arranged on the outside of the core and devices for determining the position of the control clusters in the core.

In this latter case, the mobile internal instrumentation of the core has the sole function of carrying out a periodic readjustment of the data supplied by the external instrumentation and of detecting, before the start-up of the reactor, any mistakes that might have been made during fuel loading operations.

The internal instrumentation of the core also comprises tubes or "thimbles" which are used for the protection and guidance of the measuring detectors during their displacement from the instrumentation control room to the fuel assemblies. The thimbles pass through the wall of the nuclear reactor vessel by means of feed-through sleeves disposed in general in the lower part of the vessel or over the cover. The thimbles must be withdrawn from the fuel assemblies before any fuel discharge and reloading of the reactor with fuel assemblies is carried out.

In the instrumentation control room, facilities are installed for processing the measurements provided by the detectors and, when they are mobile detectors, devices are installed to provide for their movement inside the thimbles, in the direction of introduction into the core or in the direction of withdrawal from the core.

The instrumentation of nuclear reactors, whether fixed or mobile, has certain disadvantages.

It is first of all necessary to reserve considerable space in the reactor building to house premises intended to receive the measuring equipment and the control devices for the instrumentation and the passageways for the thimbles from the premises to the reactor vessel.

In addition, it is necessary to withdraw the thimbles before each of the core refueling operations, over a length at least equal to the height of the core, which requires the provision of a sufficient clearance in the control room, the volume of which thus has to be increased still further.

When the feed-through sleeves in the wall of the vessel permitting the introduction of the thimbles are fixed to the base of the vessel, there is a risk that the primary fluid contained in the vessel will leak in the case of failure of one or more of the feed-through sleeves.

In the case where the internal instrumentation of the core passes through the wall of the vessel at its upper part formed by the cover, the upper internal items of reactor equipment may have a relatively complex structure, and the servicing times and the radiation doses received by the operational staff during the withdrawal and replacement of the thimbles, before and after refueling of the core, may be increased.

SUMMARY OF THE INVENTION

The object is therefore to propose a device for the measurement of the neutron flux in the core of a nuclear reactor comprising a vessel of a generally cylindrical shape having a vertical axis and enclosing the reactor core, a primary circuit for the circulation of the reactor coolant comprising at least one loop in communication with the internal volume of the vessel, partitioning surrounding the core inside the vessel and a cover closing the vessel at its upper part, the measuring device consisting of at least one probe for measuring the neutron flux in the reactor core movable inside at least one thimble, the measuring device having a simple structure not requiring the presence of a control room of substantial volume and enabling the operational conditions of the nuclear reactor to be simplified.

With this object in view, the measuring device according to the invention also comprises:

- a plurality of ducts for the passage and support of a thimble, which ducts are disposed in the partitioning of the core along an axial direction and substantially over the entire height of the core and are distributed circumferentially around the core,
- a plurality of feed-through sleeves in the cover of the vessel, each disposed along the axial extension of a duct for the passage of a thimble,
- guide columns each disposed along the axial extension of a duct and each engaged in a feed-through sleeve so as to form, with the corresponding duct and sleeve, a channel for the reception of a thimble, and means for the guidance, displacement, switching and parking of the mobile probe, which means are disposed outside the vessel and attached to the cover of the vessel, comprising a plurality of guide tubes each connected at one of its ends to the means for displacement, guidance and switching of the mobile probe and, at its other end, to a thimble.

The invention also relates to a method for the measurement of the neutron flux in the core of the nuclear reactor using the measuring device with the mobile probe in order to verify and readjust the measurements made by a fixed instrumentation device.

BRIEF DESCRIPTION OF THE FIGURES

In order to provide a good understanding of the invention, a measuring device according to the invention and its use in a method of measurement involving a fixed instrumentation device will now be described, by way of example and with reference to the accompanying drawings.

DESCRIPTION OF THE PREFERRED EMBODIMENT

Figure 1:
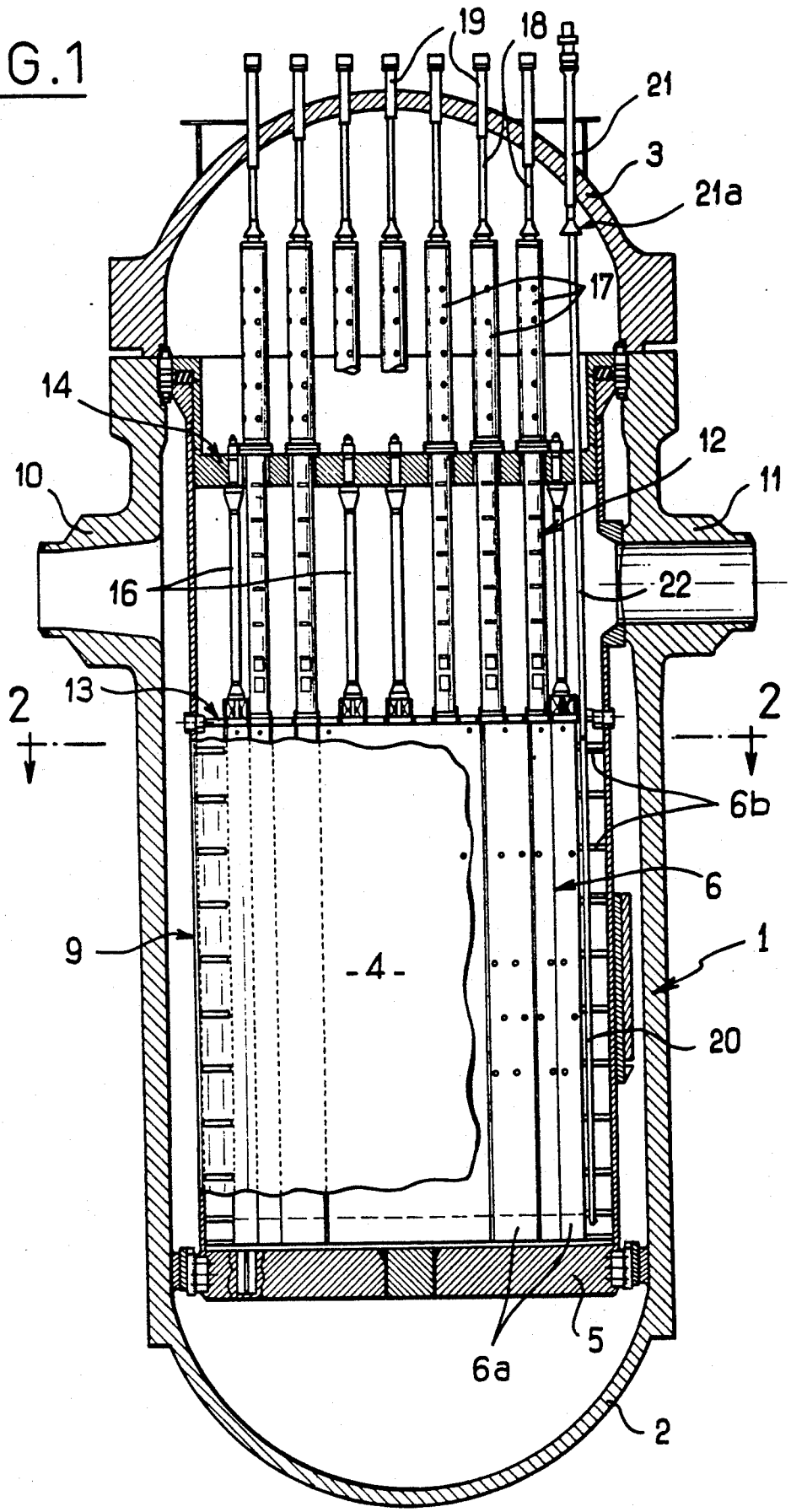
FIG. 1 is a cross-sectional view through a vertical plane of the vessel of a pressurized-water nuclear reactor incorporating elements of a measuring device according to the invention.

FIG. 1 shows the vessel 1 of a pressurized-water nuclear reactor of cylindrical shape disposed with its axis vertical and closed at its lower part by a convex base 2 and at its upper part by a convex cover.

The core 4 of the nuclear reactor, consisting of fuel assemblies having lower parts resting on a core support plate 5, is surrounded by partitioning 6 formed by vertical flat plates 6a assembled together so as to match the shape of the outer surface of the core, on which plates are fixed horizontal reinforcing plates 6b interposed between the plates 6a and the inner surface of a core shroud 9 fixed coaxially inside the vessel 1.

The vessel 1 also comprises piping such as 10 and 11 opening into the internal volume of the vessel, above the core 4. Piping such as 10 and 11 allows the correction of the ends of the loops of the primary circuit in which the reactor coolant circulates.

Above the core 4 are disposed the upper internal items of equipment 12 of the reactor which consist of the upper plate 13 of the core, a supporting plate 14 placed parallel to the upper plate 13 of the core and connected to it by columnar spacers 16 together with a set of guide tubes in two parts 17 disposed between the plates 13 and 14 and above the plate 14 vertically above certain assemblies of the core 4.

The tubes 17 provide for the guidance of absorbent control clusters of the reactor which are fixed to extension pieces 18 and which can be introduced into certain assemblies of the core, over at least a part of the height of the core, in order to control its reactivity.

The device with mobile probe for the measurement of neutron flux according to the invention comprises vertical guide ducts, such as the duct 20, which are introduced into aligned openings passing through the successive reinforcing plates 6b of the partitioning 6.

The guide ducts 20 which are disposed in the vertical direction, i.e., in a direction parallel to the axis of the vessel and to the axis of the core 4, occupy practically the entire height of the core 4 and make it possible to guide the thimble 25 of a mobile probe along the axial direction of the core and substantially along its entire height.

Figure 2:
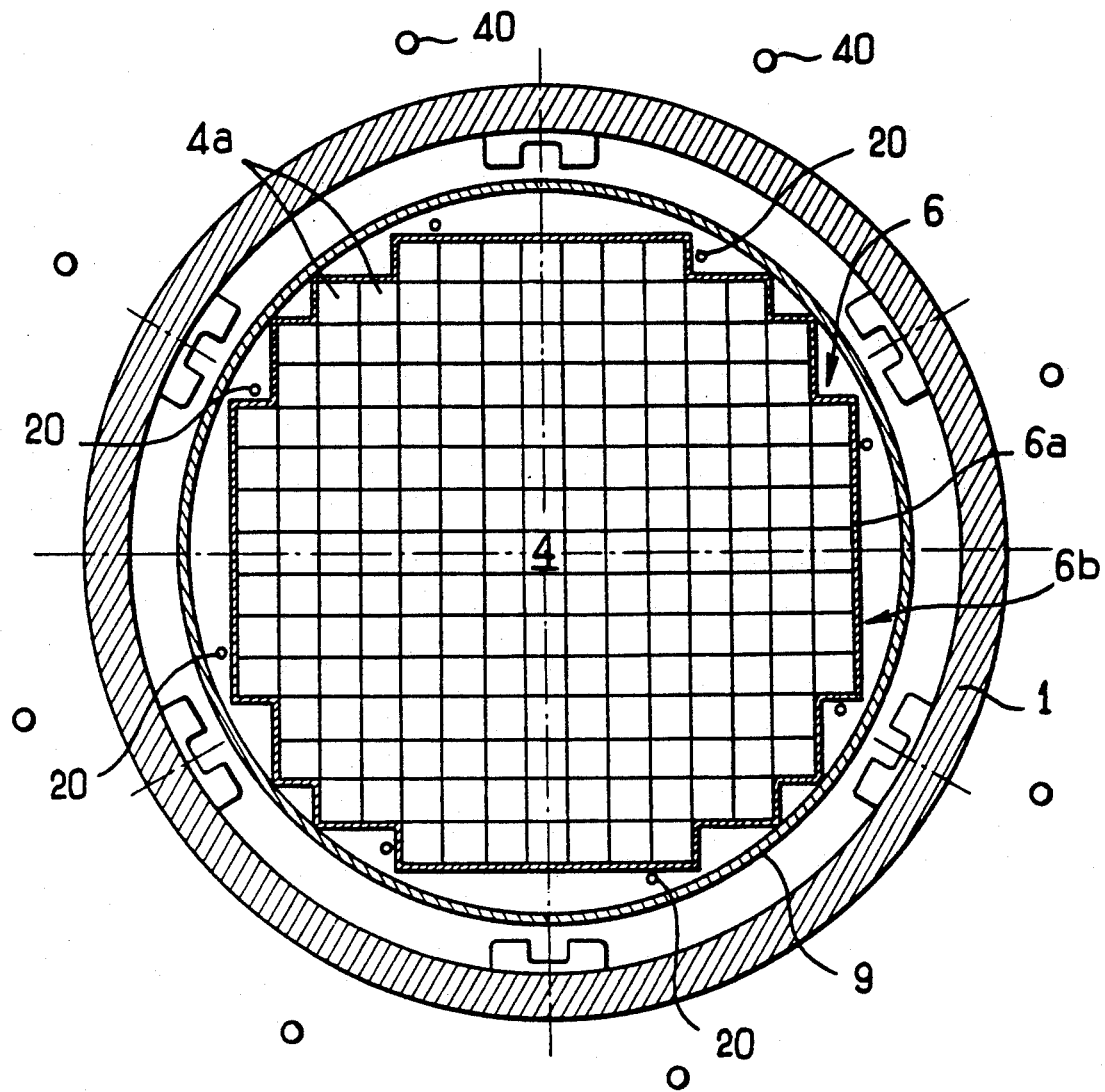
FIG. 2 is a cross-sectional view along line 2—2 of FIG. 1.

As can be seen in FIG. 2, eight guide ducts 20 are placed around the core 4 formed by fuel assemblies 4a, in positions placed at 45° to each other around the axis of the core 4.

The displacement of a mobile probe successively inside the thimbles 25 introduced into each of the guide ducts 20, along the entire height of the core 4, makes it possible to determine the spatial distribution of the neutron flux emitted by the core 4, in the axial direction of the core and in a circumferential direction.

The extension pieces 18, to which the absorbent clusters are fixed, are guided by sleeves 19 or adaptors passing through the cover of the vessel 3, as can be seen in FIG. 1.

Some of these adaptors, such as the adaptor 21, passing through the cover of the vessel 3 in the vertical direction form feed-through sleeves permitting the passage of the mobile probe for measuring neutron flux inside the vessel 1.

The feed-through sleeve 21 represented in FIG. 1 is placed along the axial extension of the guide duct 20 disposed in the partitioning 6.

The sleeve 21 consists of a lower end part 21a widened into the shape of a truncated cone making it easier to engage a hollow guide column 22 inside the sleeve 21 during the fitting of the cover. The hollow guide column 22 provides a continuous passage for the thimble of the mobile probe between the outer part of the sleeve 21 and the upper end part of the guide duct 20, this column 22 being placed along the axial extension of the duct 20 and being engaged by its upper part in the sleeve 21.

It is clear that eight feed-through sleeves in the cover 3 similar to the sleeve 21 are disposed along the axial extension of the eight guide ducts 20 disposed in the partitioning 6.

Figure 3:
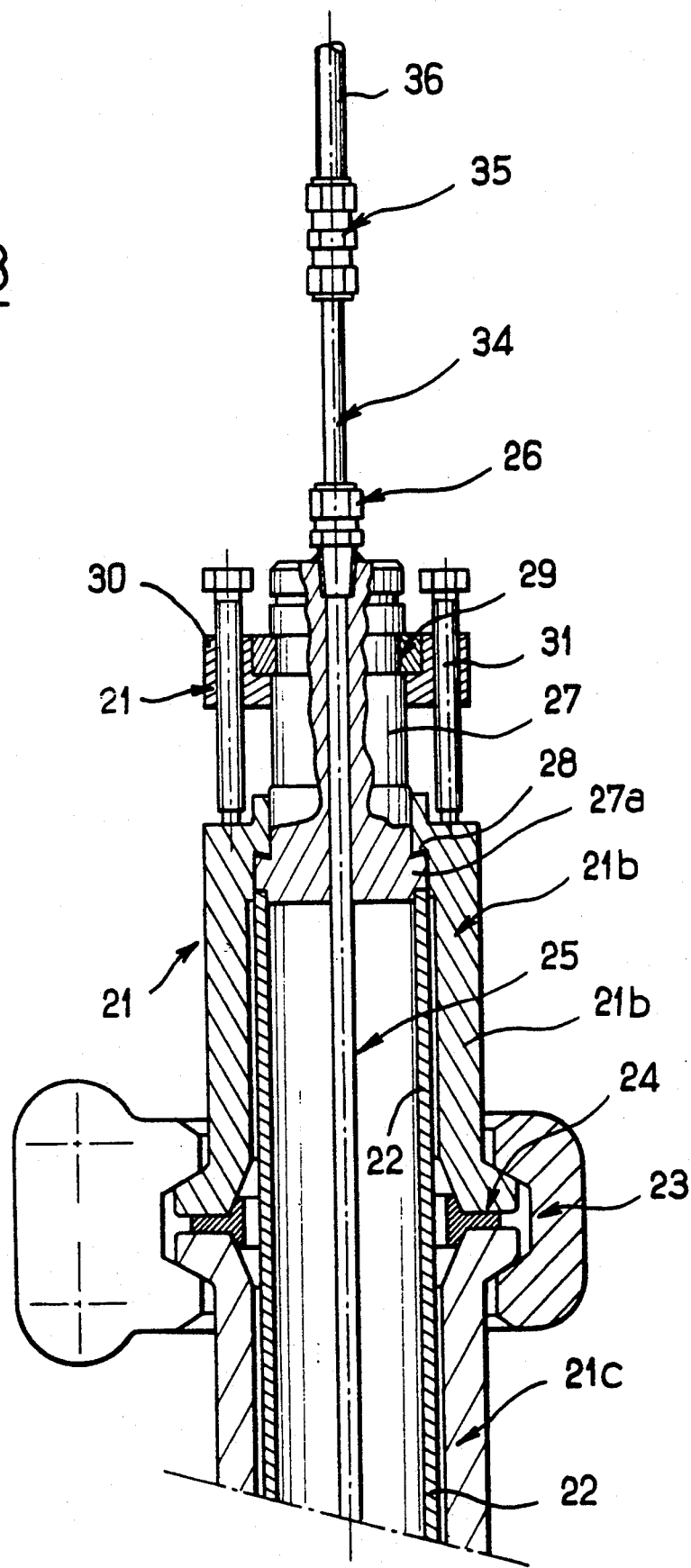
FIG. 3 is a partial cross-sectional view through a vertical plane of the upper part of a feed-through sleeve in the cover of the vessel.

As can be seen in FIG. 3, the upper part of the feed-through sleeve 21 consists of two parts 21b and 21c assembled along the axial extension of each other by a collar 23. A metallic sealing joint 24 is interposed between the parts 21b and 21c, and is clamped by the collar 23.

A thimble 25 is introduced axially into the sleeve 21, the column 22 and the guide duct 20 along their entire length and is fixed to the upper part of the sleeve 21.

The mobile probe of the measuring device according to the invention moves inside the thimble 25 which ensures its axial displacement inside the sleeve 21, the column 22 and the guide duct 20.

The thimble 25 is fixed by means of a connector 26 on to a component 27 which closes the upper end of the sleeve 21 and which contains a central channel for the passage of the thimble 25. The connector 26 is soldered on to the component 27, which incorporates a widened part 27a engaged in a recess machined in the inner bore of the part 21b of the sleeve 21. A metallic sealing joint 28 is interposed between the upper surface of the widened part 27a and the recess.

The component 27 includes a recess on its outer surface in which is engaged an O-ring 29 consisting of two parts separated by a connecting surface situated in a diametrical plane of the O-ring 29.

A clamping ring 30, through which pass screws 31, contains an internal recess in which the ring 29 is placed.

The column 22 engaged in the sleeve 21 over its entire length is attached rigidly at its upper part to the component 27, ensuring that the upper part of the sleeve 21 is closed.

The thimble 25 is connected by means of the connector 26, an intermediate section 34 and a threaded connector 35 to a guide tube 36 for the mobile probe, outside the reactor vessel and above the cover 3.

The thimble 25 fixed to the component 27 forming the upper part of the closure of the sleeve 21 is disposed inside a vertical channel formed by the internal bore of the component 27, the internal bore of the column 22 and the guide duct 20 disposed in the partitioning. The thimble 25 forming the means for guiding a mobile probe for the measurement of neutron flux is disposed along the entire height of the vertical passage channel so that the probe can be introduced into the partitioning and displaced along the whole height of the reactor core 4.

The thimble can easily be removed, for example for purposes of replacement, when the reactor is shut down. The intermediate section 34 is detached from the guide tube 36 by unscrewing the connector 35, and the solder which fixes the connector 26 to the component 27 is cleared away. The thimble 25 is withdrawn from its vertical reception channel by pulling on the intermediate section 34 disposed outside the sleeve 21.

During the removal of the cover of the vessel, for example to reload the reactor core with fuel assemblies, the thimble 25 and all its means for the guidance and support in the vessel, consisting of the component 27, the column 22 and the duct 20, can be kept in the vessel in their operational position. This obviates the need to withdraw the thimbles, which are very long and which can, during their withdrawal or replacement, suffer deterioration under the effect of the mechanical forces required to move them.

Before removing the cover 3 of the vessel, the intermediate sections 34 extending the thimbles are detached by unscrewing the connectors 35.

The component 27 which closes the sleeve 21 is maintained in a clamping position by the screws 31 coming to bear on the upper surface of the part 21b of the sleeve 21 and ensuring, by means of the ring 30 and the ring 29, the raising of the component 27, so that the sealing joint 28 is gripped inside the sleeve 21.

Prior to the removal of the cover of the vessel, the screws 31 are loosened so that the two-part ring 29 can be removed. The removal of the ring 29 enables the sleeve 21 to be detached from the component 27 and the column 22.

The collar 23 is then removed and the parts 21b and 21c of the sleeve 21 are separated.

When these dismantling operations have been carried out on each of the sleeves 21, it is possible to raise the cover 3 of the vessel while leaving the columns 22, the components 27 and the thimbles 25 in place.

During the replacement of the cover of the vessel, the components 27 and the columns 22 come to be engaged in the corresponding sleeves 21 whose lower widened parts 21a make the engagement of the component 27 easier.

The elements for clamping and sealing the component 27 are replaced and the sealed closure of the sleeve 21 is ensured by tightening the screws 31.

As can be seen in FIG. 2, the outer chambers 40 for the measurement of neutron flux are disposed in positions spaced regularly around the periphery of the vessel. The measuring chambers 40 are multi-stage fission chambers making it possible to determine the distribution of the neutron flux emitted by the reactor core along its axis.

Eight multi-stage chambers 40 are used, disposed at 45° to each other around the axis of the core and of the reactor vessel 1.

The eight ducts 20 carrying the thimbles 25 for guiding the mobile flux-measuring probe are placed in arrangements aligned radially with respect to the positions of the multi-stage chambers 40.

Figure 4:
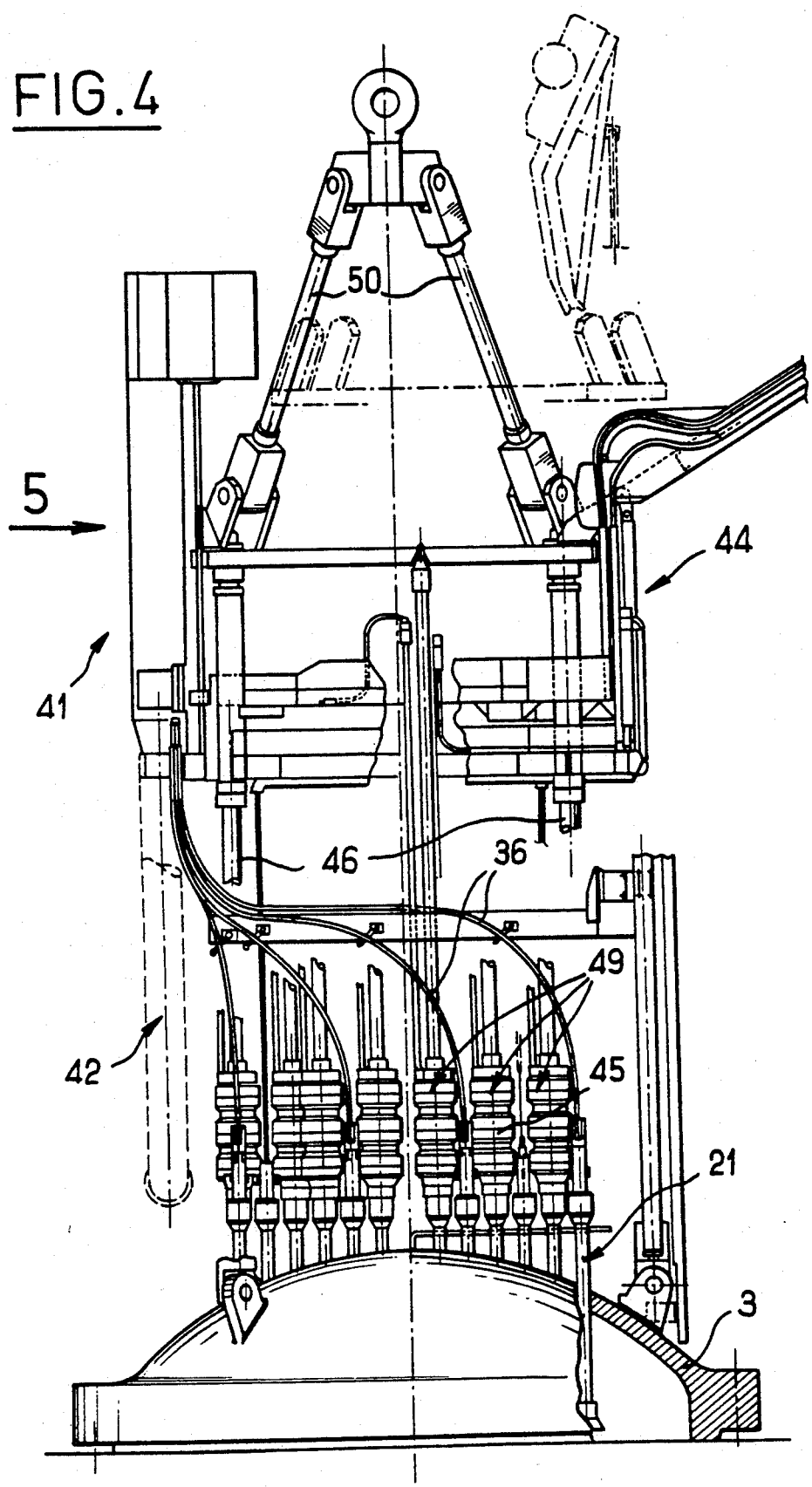
FIG. 4 is a view in elevation of the structures of the reactor disposed above the cover of the vessel and of a part of the measuring device.
Figure 5:
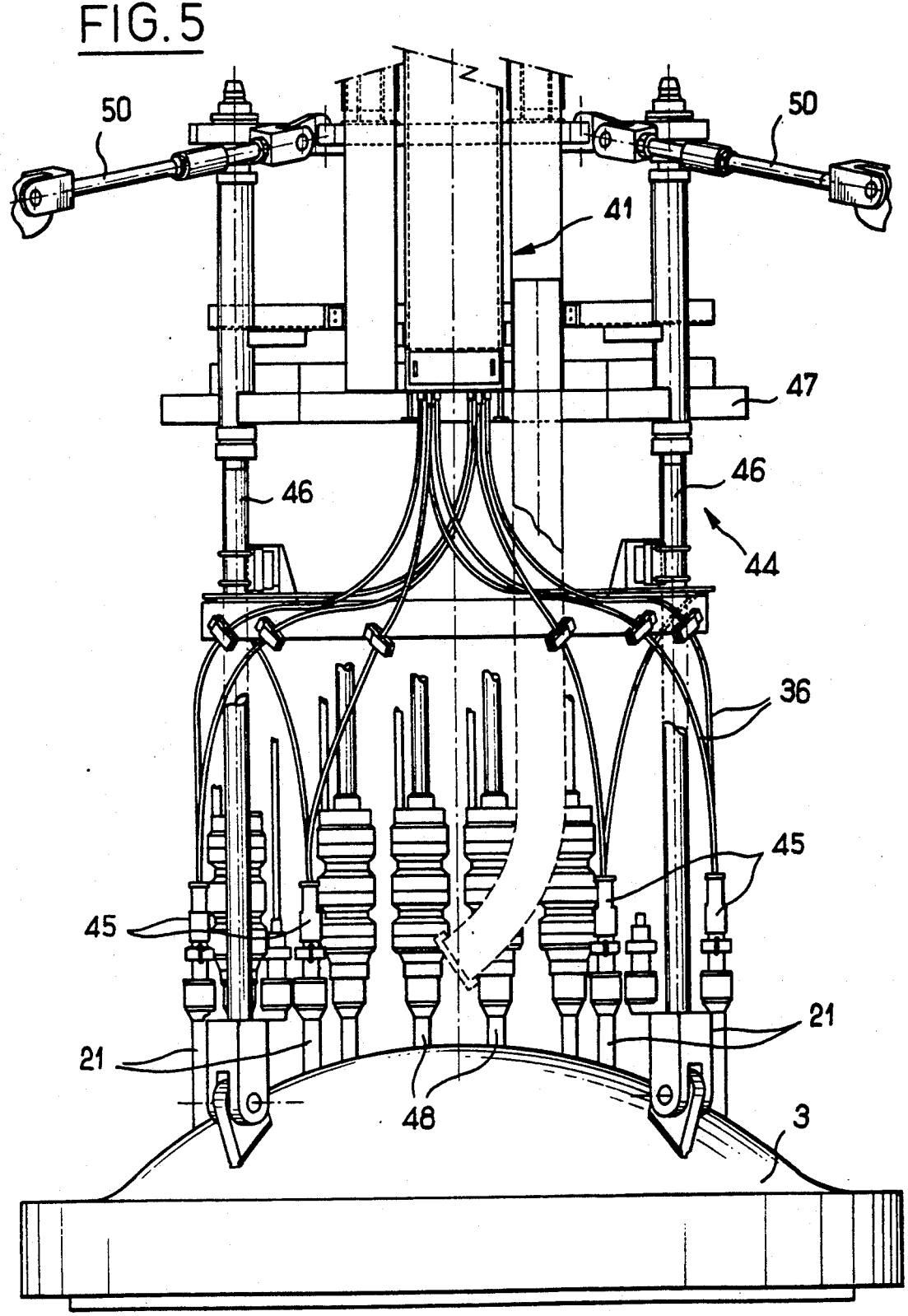
FIG. 5 is a side view in the direction of the arrow 5 of FIG. 4.

As can be seen in FIGS. 4 and 5, the flexible tubes 36 for guiding the mobile probe are connected at one of their ends to a control box 41 containing means for displacement, means for guidance and means for switching of the mobile probe, and at their other ends to the intermediate sections 34 for connection to the thimbles 25.

In practice, as will be explained later, two mobile probes are used, one of which is a replacement probe in case of the failure of the probe used for the measurements in each of the thimbles 25.

A case 42 for parking the measuring probes is disposed in the extension of the box 41. The case 42 incorporates a wall which absorbs radiation, thus enabling operators to be protected during manipulation of the probes.

The intermediate sections 34, the connectors 26 and 35 and the upper part of the sleeves 21 comprising the means for clamping the closure components 27 are placed inside protective casings 45.

The box 41 and the guide tubes 36 are carried by a structure 44 attached to the cover 3 of the vessel. The structure 44 consists of the pillars 46 for lifting the cover of the vessel 3 and of transverse supporting elements 47 connected to the pillars 46.

Adaptors 28 passing through the cover 3, assure the passage and guidance of extension pieces to the ends of which are fixed the absorbent clusters for controlling the nuclear reactor. Mechanisms 49 for the displacement of the clusters are fixed to the adaptors 48 above the cover of the vessel.

The sleeves 21 consist of eight adaptors, similar to the adaptors 48, which are not used for the passage of the extension pieces of control clusters.

The structure 44 and the box 41 are held by articulated tie rods 50 attached at one of their ends on to the structure of the nuclear reactor in such a way that they can be detached, so as to provide for the separation of the cover of the vessel from the reactor structure before the removal of the cover 3.

All the components of the measuring device according to the invention disposed outside the vessel are therefore attached on to the cover of the vessel.

Figures 6, 7:
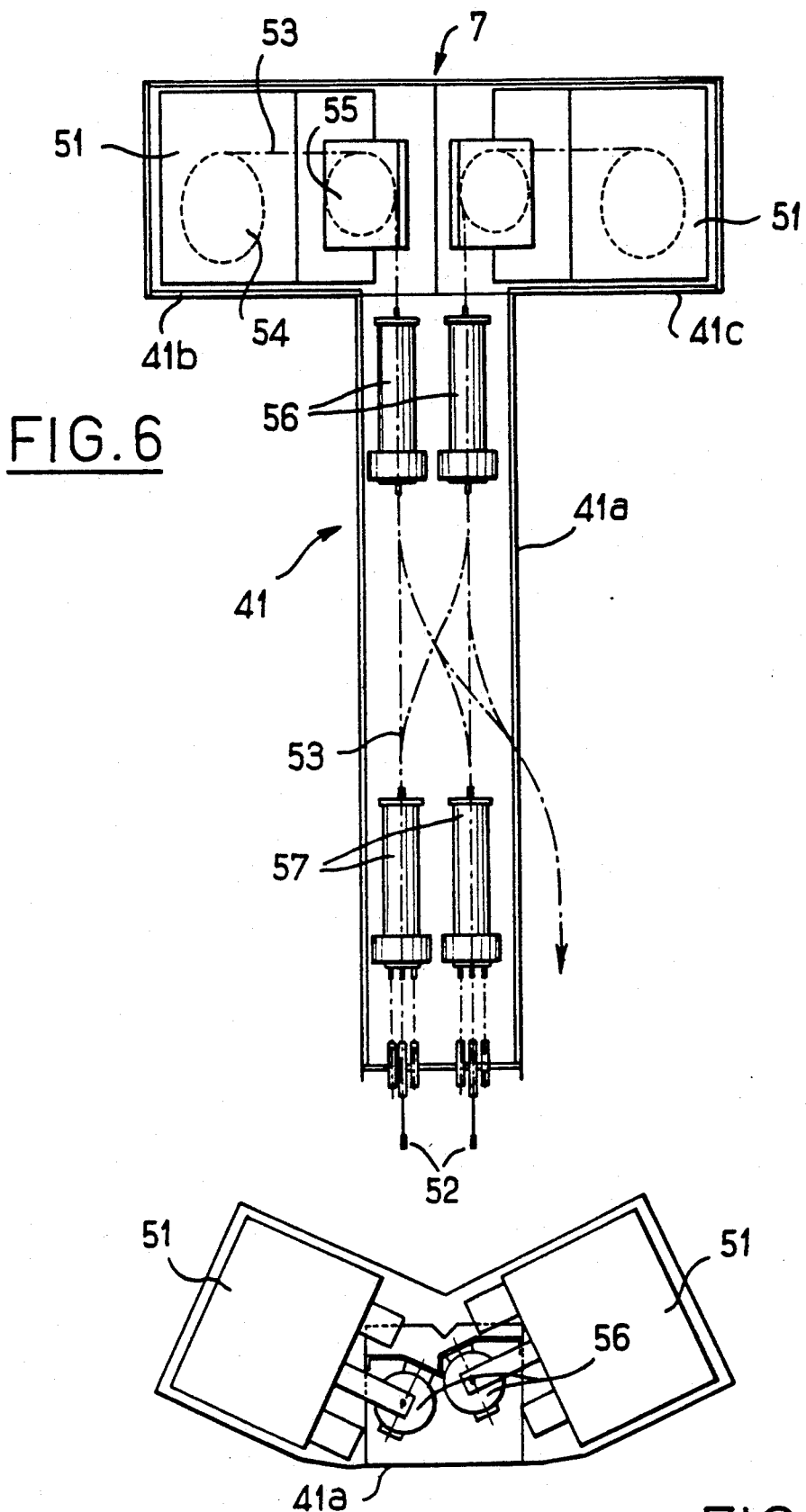
FIG. 6 is a cross-sectional view through a vertical plane of a part of the measuring device placed above the cover of the vessel.
FIG. 7 is a top plan view in the direction of the arrow 7 of FIG. 6.

As can be seen in FIGS. 6 and 7, the box 41 comprises a vertical body 41a and two upper elements of the box 41b and 41c each used to provide for the displacement of a mobile probe.

A unit 51 for the control and displacement of a mobile probe is disposed inside each of the upper elements 41b and 41c of the box.

The mobile probe 52 is fixed to the end of a cable 53 which is used to drive the probe and transmit the measurement signals from the probe.

The control unit 51 contains a winding machine and a motorized driving pulley 55.

In the part 41a of the box 41, on each of the lines of passage of a probe 52 fixed to a cable 53, there are a first three-channel rotary selector 56 and a second four-channel rotary selector 57.

The rotary selectors 56 and 57 can be controlled in order to ensure the passage of the probe 52 either in the direction of one of the eight guide tubes connected to one of the eight thimbles 25 introduced into the partitioning of the reactor core, or in the direction of the parking case 42.

By using the control units 51 and the selectors and 57, it is thus possible to carry out with the same probe successive measurements of neutron flux inside each of the thimbles 25 and along the entire height of the core. It is also possible, should a probe fail, to replace the defective probe in the parking case and withdraw the replacement probe which can be directed towards a thimble 25.

The mobile probe device according to the invention is used to check and readjust the flux measurements made by using the fixed instrumentation the reactor.

This fixed instrumentation comprises the eight external multi-stage fission chambers 40 distributed around the reactor vessel 1 which make it possible to obtain the axial flux distribution in the reactor core 4 and a set of additional facilities which will be described below.

The fixed instrumentation furthermore comprises sixty thermocouples installed in the internal upper equipment of the reactor, i.e., inside the vessel above the core. The thermocouples are distributed in the transverse cross-section of the core so as to allow the measurement of the temperature of the reactor coolant at the output of the core and the determination of the radial distribution of the power in the core 4. The fixed instrumentation also includes devices for measuring the position of the absorbent control clusters in the reactor core 4, these devices consisting of step counters combined with extension pieces to which the absorbent clusters are fixed. The extension pieces in fact consist of a gear wheel cooperating with pawls of the mechanisms 49 for displacing the absorbent clusters, whose position can be determined by counting the number of steps in the direction of withdrawal and the direction of insertion into the core made by the extension pieces. The instrumentation also includes probes for measuring the temperature at the entrance and exit of each of the primary loops, i.e., at the ends of the primary loops in communication with the internal volume of the vessel.

The instrumentation also includes pressure sensors for measuring the pressure of the primary reactor coolant and flowmeters for measuring the rate of flow of the coolant circulating in each of the primary circuit loops.

In order to determine the instantaneous distribution of the flux or of the power in the reactor core, the following operations are carried out:
  the neutron flux emitted by the reactor core is measured outside the vessel at different sites distributed around the vessel and spaced along the axial direction of the vessel, using multi-stage chambers,
  the temperature of the primary coolant in sites located above the core and distributed over the transverse cross-section of the core is measured using the thermocouples,
  the position of the control clusters in the reactor core is measured using the step counters,
  the temperature of the primary coolant at the ends of each of the primary loops in communication with the reactor vessel is measured,
  the pressure of the primary coolant is measured,
  the flow rate of the primary coolant circulating each of the primary loops is measured, and
  from these measurements, the spatial distribution of the neutron flux in the reactor core is calculated.

In order to calculate the spatial distribution of the neutron flux or of the power in the reactor core from the measurements, a computer is used which receives the measurement signals in digital form and uses a three-dimensional program for the calculation.

It should be noted that all the fixed instrumentation is disposed outside the reactor core, which permits a considerable simplification of the maintenance operations for the nuclear reactor, particularly the operations involving fuel discharge and refueling.

However, in order that the flux distribution in the core, reconstructed by a calculation using the fixed instrumentation, should be known with high accuracy, it is necessary to be assured that the various sensors provide indications which do not change in the course of time.

Hence, a periodic readjustment of the flux values obtained from the fixed instrumentation is carried out by using the mobile probe device which has been described above.

Direct flux measurements are made with the mobile probe in sites situated near the core, inside the partitioning, so that these measurements make it possible to carry out certain corrections and certain readjustments of the measurements made by the fixed instrumentation.

The device for the measurement of neutron flux according to the invention has the advantage of containing no element which has to be introduced into the fuel assemblies of the reactor core to make the measurements.

The mobile probe measuring device enabling periodic readjustments to be made contains elements for guiding and positioning disposed in the partitioning of the reactor core and a set of facilities disposed outside the reactor vessel and carried by the cover of the vessel.

This device requires only simple dismantling before the removal and lifting of the vessel cover is carried out before refueling.

It is not necessary to have a large volume available inside the reactor building to house the premises for the instrumentation when the device and the method of measurement according to the invention are used.

The advantages of the device and the method according to the invention are achieved particularly by the fact that the means used for the measurements, both as regards the mobile probe device and the fixed instrumentation device, are disposed outside the reactor core formed by the fuel assemblies.

The device for the measurement of neutron flux with a mobile probe may comprise a single mobile probe without it being necessary to provide a replacement probe.

Means other than a probe may be used as the mobile instrumentation to measure the flux, such as gamma thermometers, aeroballs or hydroballs.

It is possible to use any number of thimbles distributed around the axis of the core to provide for the guidance of the mobile probe.

The ducts for the passage and support of the thimbles may be disposed in any part of the partitioning of the core.

The means for displacement, guidance and switching of the probes may be different from the means described above.

The fixed instrumentation of the core may be different from what has been described and may, for example, include a number of multi-stage fission chambers other than eight.

The means of measurement in the fixed instrumentation which are known and used separately from each other in instrumentation devices according to the prior art may be of any type whatsoever.

Finally, the device and the method according to the invention may be used in the case of any nuclear reactor comprising a core disposed in a vessel closed by a cover at its upper part and surrounded by a supporting structure similar to a partitioning.

We claim:

1. Device for measuring the neutron flux in the core (4) of a nuclear reactor comprising a vessel (1) of generally cylindrical shape having a vertical axis and enclosing the reactor core (4), a primary circuit for the circulation of the reactor coolant comprising at least one loop in communication with an internal volume of the vessel, partitioning (6) surrounding the core inside the vessel (1) and a cover (3) closing an upper part of the vessel (1), the measuring device consisting of at least one probe (52) movable inside at least one thimble (25) for measuring the neutron flux in the reactor core (4), said device further comprising:
   (a) a plurality of ducts (20) for the passage and support of a thimble (25), said ducts being disposed in the partitioning (6) of the core along an axial direction and substantially over the entire height of the core (4) and being distributed circumferentially around the core (4);
   (b) a plurality of feed-through sleeves (21) in the cover (3) of the vessel, each feed-through sleeve being disposed along the axial extension of a duct (20) for the passage of a thimble (25);
   (c) guide columns (22) each disposed along the axial extension of a duct (20) and each engaged in a feed-through sleeve (21) so as to form, with the corresponding duct (20) and sleeve (21), a channel for the reception of a thimble (25); and,
   (d) means for the guidance, displacement, switching and parking (41, 42, 51, 56, 57) of the mobile probe (52), said means being disposed outside the vessel (1) and attached to the cover (3) of the vessel, and comprising a plurality of guide tubes (26) each having one end connected to the means for displacement, guidance and switching (51, 56, 57) of the mobile probe (52), and the other end to a thimble (25).

2. Device according to claim 1, wherein the means for the guidance, displacement and switching (51, 55, 56, 57) of the mobile probe (52) are displaced inside a box (41) attached to the cover (3) of the vessel (1).

3. Device for the measurement of the neutron flux in the core (4) of a nuclear reactor according to claim 1, further comprising:
   (a) at least four external multi-stage fission chambers (40) distributed around the vertical axis of the core (4);
   (b) a plurality of thermocouples disposed in the upper internal structures of the reactor above the core (4) in positions distributed around the axis of the core (4);
   (c) step counters for the determination of the position of the control clusters in the core (4);
   (d) at least two temperature probes associated with each of the primary loops for the measurement of the temperature of the primary coolant at the entrance and the exit of the loop;
   (e) at least one pressure sensor for the determination of the pressure of the primary coolant; and
   (f) at least one flowmeter in each of the primary loops for measuring the flow rate of the primary coolant.

4. Device according to claim 2, wherein the means for parking the mobile probe (52) consists of a case attached rigidly to the box (41).

5. Device according to any one of claims 1 to 4, comprising a first mobile probe (52) which constitutes the measuring probe and a second mobile probe which constitutes a replacement probe to be used in case of the failure of the measuring probe.

6. Device according to claim 5, wherein the means for switching (56, 57) the mobile probes (52) consist of rotary selectors enabling the probes (52) to be directed either towards any one of the thimbles (25) or towards the means for parking (42) the mobile probes.

7. Device according to any one of claims 1 to 4, wherein each of the thimbles (25) is attached on an upper end component (27) which closes the sleeve (21) and is connected by means of an intermediate section (34) and a threaded connector (35) to a guide tube (36).

8. Device according to claim 7, wherein the column (22) engaged in the sleeve (21) is attached rigidly to the end component (27) which closes the sleeve (21) and the closure component (27) is attached in a leak-proof and detachable manner to the outer end of the sleeve (21).

9. Device according to claim 8, wherein the sleeve (21) comprises, outside the vessel (1) and above the cover (3), two successive parts (21a and 21b) in the axial direction connected to each other in a leak-proof manner by means of a detachable collar (23) and a sealing joint (24).

10. Method for the measurement of the neutron flux in the core (4) of a nuclear reactor comprising a vessel (1) of cylindrical shape having a vertical axis and enclosing the reactor core (4), partitioning (6) surrounding the core (4) inside the vessel (1), a cover (3) closing the vessel (1) at its upper part, tubular sleeves (21, 48) passing through the cover (3) of the vessel (1), control rods mounted in at least one part of the sleeves (48) in order to be guided in these sleeves and to ensure the displacement in the core (4) of absorbent control clusters, fixed to the control rods, for the control of the reactivity of the core (4) and at least one primary loop connected to the vessel (1) in which primary coolant of the reactor circulates, said method comprising the steps of:

(a) measuring the neutron flux emitted by the reactor core (4) outside the vessel (1) at different sites distributed around the vessel and spaced along the axial direction of the vessel (1);

(b) measuring the temperature of the primary coolant in sites located above the core (4) and distributed over the transverse cross-section of the core;

(c) measuring the position of the control clusters in the reactor core (4);

(d) measuring the temperature of the primary coolant at the ends of each of the primary loops in communication with the reactor vessel (1);

(e) measuring the pressure of the primary coolant;

(f) measuring the flow rate of the primary coolant circulating in each of the primary loops; and (g) calculating from the measurements carried out the spatial distribution of the neutron flux in the reactor core.

11. Method of measurement according to claim 10, including the steps of readjustment in the values of the spatial distribution of the neutron flux in the reactor core (4).

* * * * *